Patented Oct. 7, 1952

2,613,163

UNITED STATES PATENT OFFICE 2,613,163

LINOLEUM COMPOSITIONS

Charles G. Elliott, Lancaster, Pa., assignor to Armstrong Cork Company, Lancaster, Pa., a corporation of Pennsylvania No Drawing. Application May 13, 1950, Serial No. 161,897

16 Claims. (Cl. 106—265)

This invention relates to linoleum compositions suitable for use in the manufacture of floor and wall coverings, sink tops, and counter tops. More particularly it relates to the preparation of a linoleum cement which is characterized by unusual alkali resistance. Although the invention will be particularly described with reference to the preparation of a linolcum cement and a linoleum composition therefrom for use in the manufacture of sheet material, it is to be understood that the cement produced in accordance with this invention may also be utilized in the manufacture of mastic tile.

The cements or binders used in the manufacture of the material known to the art as linoleum are well known and contain a binder commonly referred to as a linoleum cement, such term being well known to the workers in the linoleum art. This binder may be prepared by thickening or bodying a drying oil or semidrying of animal or vegetable origin. For the purposes of this application, the term "siccative oil" is intended to embrace those animal and vegetable drying and semidrying oils commonly used in the manufacture of linoleum cement. The thickening or bodying of the siccative oil may be accomplished in a number of ways such as by oxidation, by polymerization induced by heat, or by a combination of heat and oxidation. For instance, polymerization may be obtained by simply heating the oil to a high temperature on the order of 500° F. for a number of hours, generally 72 hours or longer. The resulting product is known as "Taylor Oil Cement." The preparation of this type of cement is described in British Patent 2,057 of 1871. The oxidation and polymerization may also be effected by trickling the oil over hanging sheets such as scrim cloth. This product is known as "scrim" or "shed" oil. The process of producing this product is described in British Patents 209/1860 and 1,037/1863 to Frederick Walton, recognized as the inventor of linoleum. Still another method which may be employed in obtaining linoleum cement is that embodying the blowing of air through a quantity of oil in an oxidizer. This product, known as "mechanical oil," and a process of preparing it are described in British Patent 7,742 of 1893 to Wood-Bedford. In all of the above referred to methods, a semi-solid plastic mass of siccative oil gel is obtained. For a number of years the linoleum cement was prepared by first oxidizing and/or polymerizing the oil by one of the above methods. After the production of the siccative oil gel as outlined above, the material is combined with a resin to form linoleum cement. It was later found that a highly improved cement could be obtained by oxidizing and polymerizing the siccative oil in the presence of the resin since the resin acted as a peptizer or gel-retarding agent for the oil. This is found to be advantageous since the blowing process could be carried out for a much longer period of time due to the fact that the oil remained more fluid due to the presence of the resin and enabled the passage of air through the mass under oxidation.

Although a number of resinous materials have been employed in the production of linoleum cement, for all practical purposes, rosin is the only resinous material which is widely used. This is probably due to a number of reasons, among which the chief would be the ready availability and comparatively low cost of the material. In addition, the peptizing or gel-retarding action of rosin is of the highest order. At the present time, probably most of the commercially available linoleum is prepared from a cement obtained by oxidizing and polymerizing a siccative oil in the presence of rosin and suitable driers such as manganese and lead naphthenate. Generally speaking, the charge to the oxidizer comprises about 65% to 85% by weight of siccative oil and about 15% to 35% by weight of resin. Although, as pointed out, rosin is the most widely used material, other resins may be employed, for example, ester gum, kauri gum, copal resin, alkyd resin, rosin-modified phenol aldehyde, phenol aldehyde resins, and the like. Although linseed oil is probably the most desirable siccative oil for use in the production of linoleum, other siccative oils may be used such as soya bean oil, menhaden oil, perilla oil, rapeseed oil, China-wood oil, dehydrated castor oil, and the like. In some instances, the siccative oils can be modified by the addition of other materials such as tall oil, tall oil esters, and the like.

Thus, the bulk of the linoleum cements now used in the art contains an oxidized and polymerized siccative oil and a resin, chiefly rosin. Although these linoleum cements have been used for a number of years with great success in the production of linoleum compositions from which the hard surface floor covering known as linoleum is produced, linoleum does have certain limitations because of the characteristics thereof. The chief limitation of the product appears to be due to its lack of resistance to alkaline materials such as those which are commonly found in strong soaps and cleaning powders. It is, therefore, necessary to exercise considerable caution in the care of linoleum floors. Another problem in connection with the linoleum containing a cement which includes rosin is that the material cannot be recommended for use as a below grade floor covering. For example, linoleum is not recommended for use as a floor covering for basement floors because of the alkali which is emitted from concrete and similar cement surfaces due to the moisture normally present in such areas. Continued exposure to such alkali results in disintegration of the flooring due in large measure to the presence of saponifiable material such as rosin in the binder.

Faced with this problem, the workers in the linoleum art have for a considerable number of years been endeavoring to prepare a composition which has increased resistance to alkali. Quite a variety of additives have been incorporated in linoleum cement to accomplish this desired end, but for one reason or the other none of the modified cements has been as suitable or as practical as the rosin-containing cement. In some instances, increased cost of manufacture has made the alkali-resistant cements noncompetitive. In other instances, the cements cannot be processed in conventional linoleum-making equipment, which equipment is highly expensive and highly specialized. Still other materials which have been included are of such a nature that they emit obnoxious gases in the stoving step which is considered an essential step in the production of linoleum; and therefore, such modifiers have not met with success.

A rather large number of nonacidic materials have been substituted completely for the rosin component of linoleum cement; but these materials, although improving the alkali resistance, result in the loss of certain other desirable characteristics in the finished product such for example as resiliency, flexibility, and uniformity of hardness after curing. By way of explanation of the last mentioned difficulty, some materials may be substituted for rosin and result in a rather attractive looking sheet but upon subjection to test it will be found that because of the nature of the material it has not cured uniformly in stoving, thereby resulting in a product having what is known to the art as a soft center. Soft-centered material is highly undesirable because of indentation which results in normal use. As a result of the above problem, a number of materials have been proposed as a substitute for rosin or equivalent resins. However, such materials have met with little success.

I have found that a specific by-product of the pyrolysis of petroleum oil may be employed in the manufacture of linoleum cement in place of rosin and produce a product which possesses excellent alkali resistance and which, in addition, possesses substantially all of the other desirable characteristics of a linoleum floor covering manufactured with a rosin-containing cement.

The peptizing or gel-retarding agent employed in the practice of my invention is a polymer obtained as a by-product in the pyrolysis of petroleum. It is generally cyclic in character and contains about 10% aromatic hydrocarbons. It boils in the range of 200° C. to 500° C. and has an iodine number of about 190 to 250, advantageously 230 to 250, and an acid number of about 2. It contains about one double bond for every fourteen carbon atoms in the molecule and some conjugation. Nearly all of the molecules in the material are of a cyclic structure. It has an average molecular weight of about 400 and has a ring content of about 78%. The paraffin and side chains in the material are about 22%.

In one embodiment of my invention, a mixture of siccative oil such as linseed oil and the cyclic unsaturated hydrocarbon fraction derived from petroleum and described more fully above is charged to a suitable oxidizer which may be a jacketed kettle containing agitators such as paddles. The proportions of the ingredients charged are advantageously about 60% to 85% by weight of siccative oil and 15% to 40% by weight of the petroleum derivative. Conventional amounts, such as up to about 0.8%, on the siccative oil, of driers are used. The material is subjected to oxidation by passing a stream of air through the mass which has been heated to a temperature such as about 170° F. to 220° F. In some instances, depending upon the particular charge to the oxidizer, it may be desirable to operate at lower temperatures. For example, a dehydrated castor oil-petroleum derivative can be processed at a temperature of about 150° F. to 160° F. Oxidation is allowed to proceed while agitating the mass and maintaining the elevated temperature until the material thickens to a gel-like structure; this normally requires about 25 to 35 hours. Cements can be made from mixtures containing as little as 50% by weight of siccative oil, but with less than 50% of siccative oil it is very difficult to get the desired gel formation. The material is removed from the oxidizer and combined with the usual ingredients employed in the production of linoleum mix. Typical cement formulations are given in the following specific examples.

Example I

| | Per cent |
|---|---|
| Linseed oil | 50 |
| Petroleum derivative | 50 |

Example II

| | |
|---|---|
| Linseed oil | 60 |
| Petroleum derivative | 40 |

Example III

| | |
|---|---|
| Linseed oil | 65 |
| Petroleum derivative | 35 |

Example IV

| | |
|---|---|
| Linseed oil | 75 |
| Petroleum derivative | 25 |

Example V

| | |
|---|---|
| Linseed oil | 85 |
| Petroleum derivative | 15 |

Example VI

| | |
|---|---|
| Soya bean oil | 75 |
| Petroleum derivative | 25 |

Example VII

| | |
|---|---|
| Dehydrated castor oil | 75 |
| Petroleum derivative | 25 |

In the production of linoleum type compositions, binders or cements prepared as indicated above are combined with suitable pigments, which may be any color pigment commercially known to the art, and fillers, which may be organic fillers such as finely divided cork particles, wood flour, and the like, or inorganic fillers, for example asbestos, limestone, and the like. Generally speaking, a linoleum composition contains about 24% to 40% by weight of binder and about 60% to 76% by weight of pigment and filler.

The following are typical of linoleum compositions made in accordance with my invention.

Example VIII

| | Parts by weight |
|---|---|
| Linoleum cement | 126 |
| Whiting | 252 |
| Cork particles | 140 |

Example IX

| | Parts by weight |
|---|---|
| Linoleum cement | 128 |
| Wood flour | 35 |
| Cork particles | 101.5 |
| Whiting | 180 |

The products prepared by sheeting compositions as typified by Examples VIII and IX and stoving or curing the same in stoves at elevated temperatures such as 160° F. to 200° F. for about 7 to 30 days, depending on the gauge of the sheet, have been tested for alkali resistance and have shown a 30% to 40% increase in alkali resistance over the conventional rosin-containing linoleums when subjected to the spot alkali test.

In the spot alkali test, two 1 square inch areas of the material under test are marked adjacent to one another. On one of the areas, an initial penetration test is made, using 150 pounds on a 0.178" diameter flat tip for 30 seconds, and the percent initial penetration is calculated. To the other area is applied approximately 1 cc. of a 2% solution of NaOH which is allowed to remain in contact with the surface for 30 minutes. The alkaline solution is removed by washing with tap water and blotted dry. The exposed area is then allowed to dry for 3 to 5 minutes. An initial penetration test is then performed on the area exposed to the alkaline solution using the same conditions, and the percent initial penetration is calculated. The difference in percent initial penetration between the unexposed area and the alkali-treated area is then calculated and reported as the percent change in initial penetration due to alkali.

In addition, the other characteristics such as uniformity of hardness, flexibility, and resiliency are substantially equal to conventional linoleum.

In another embodiment of my invention, which is preferred in order to increase alkali resistance, I have found that an alkaline material such as lime may be incorporated with the siccative oil-petroleum derivative composition which is subjected to oxidation. In this embodiment of my invention, the oxidizer is charged with a mixture containing siccative oil-petroleum derivative and alkaline material such as lime. This mixture is subjected to conventional oxidizing conditions, and the resulting product admixed with filler and pigment and formed into a sheet in a conventional manner. Sheets prepared from the lime-siccative oil-petroleum derivative composition exhibit an improvement in alkali resistance of 50% greater than that of the conventional linoleum made from a rosin-containing linoleum cement when subjected to the spot alkali test. The quantity of lime added to the mixture may vary somewhat but is generally controlled in the following manner. The ordinary linoleum cement prepared from rosin has an acid number of approximately 40. However, if the theoretical amount of lime were added to neutralize the acid number, the resulting sheet would be hard and brittle on aging, and oxidizing time would be increased to about twice that of normal oxidation. Therefore, lime cannot be added as a neutralizing agent in the production of rosin-containing cements. However, when the petroleum derivative described hereinabove is used in the preparation of linoleum cement, the acid number is normally 18 and the theoretical amount of lime required to neutralize this acid number can be added in this amount without adversely affecting the resilient characteristics of the product. Generally speaking, I find it advantageous to add sufficient lime to the charge to reduce the final acid number of the cement to about 4.

While I have indicated a preference for the addition of lime in the initial phase of the oxidation, if desired, the material may be added at any stage thereof. Also, it can be milled into the cement following its preparation. Generally speaking, this is the least desirable because of the difficulty of accomplishing complete dispersion to neutralize the acidity.

I claim:

1. A method of making linoleum type cement which comprises oxidizing and polymerizing a mixture containing at least 50% by weight of a siccative oil and a cyclic petroleum hydrocarbon fraction obtained as a by-product of the pyrolysis of petroleum, said fraction boiling between about 200° C. and 500° C., containing about 10% aromatics and having an iodine number of about 190 to 250.

2. A method of preparing a linoleum type cement which comprises oxidizing and polymerizing a mixture containing at least 50% by weight of a siccative oil, a cyclic petroleum hydrocarbon fraction obtained as a by-product of the pyrolysis of petroleum; said fraction boiling between about 200° C. and 500° C., containing about 10% aromatics and having an iodine number of about 190 to 250; and sufficient lime to reduce the acid number of the final product to at least about 4.

3. A linoleum type cement comprising the product obtained by oxidizing and polymerizing a mixture containing at least 50% by weight of a siccative oil and a cyclic petroleum hydrocarbon fraction obtained as a by-product of the pyrolysis of petroleum, said fraction boiling between about 200° C. and 500° C., containing about 10% aromatics and having an iodine number of about 190 to 250.

4. A linoleum type cement comprising the product obtained by oxidizing and polymerizing a mixture containing at least 50% by weight of a siccative oil, a cyclic petroleum hydrocarbon fraction obtained as a by-product of the pyrolysis of petroleum; said fraction boiling between about 200° C. and 500° C., containing about 10% aromatics and having an iodine number of about 190 to 250; and sufficient lime to reduce the acid number of the composition to at least about 4.

5. A linoleum type composition comprising a pigment, a filler, and a cement containing the product obtained by oxidizing and polymerizing a mixture containing at least 50% by weight of a siccative oil and a cyclic petroleum hydrocarbon fraction obtained as a by-product of the pyrolysis of petroleum, said fraction boiling between about 200° C. to 500° C., containing about 10% aromatics and having an iodine number of about 190 to 250.

6. The product obtained by stoving the composition of claim 5.

7. A linoleum type composition comprising a pigment, a filler, and a cement containing the product obtained by oxidizing and polymerizing a mixture containing at least 50% by weight of a siccative oil, a cyclic petroleum hydrocarbon fraction obtained as a by-product of the pyrolysis of petroleum; said fraction boiling between about 200° C. to 500° C., containing about 10% aromatics and having an iodine number of about 190 to 250; and sufficient lime to reduce the acid number of the composition to at least about 4.

8. The product obtained by stoving the composition of claim 7.

9. A linoleum type cement comprising the product obtained by oxidizing and polymerizing a mixture containing about 60% to 85% by weight of linseed oil and about 15% to 40% by weight of a cyclic petroleum hydrocarbon fraction obtained as a by-product of the pyrolysis of petroleum; said fraction boiling between about 200° C. and 500° C., containing about 10% aromatics and having an iodine number of about 190 to 250.

10. A linoleum type cement comprising the product obtained by oxidizing and polymerizing a mixture containing about 60% to 85% by weight of soya bean oil and about 15% to 40% by weight of a cyclic petroleum hydrocarbon fraction obtained as a by-product of the pyrolysis of petroleum, said fraction boiling between about 200° C. and 500° C., containing about 10% aromatics and having an iodine number of about 190 to 250.

11. A linoleum type cement comprising the product obtained by oxidizing and polymerizing a mixture containing about 60% to 85% by weight of dehydrated castor oil and about 15% to 40% by weight of a cyclic petroleum hydrocarbon fraction obtained as a by-product of the pyrolysis of petroleum, said fraction boiling between about 200° C. and 500° C., containing about 10% aromatics and having an iodine number of about 190 to 250.

12. A linoleum type composition comprising a pigment, a filler, and a cement containing the product obtained by oxidizing and polymerizing a mixture containing about 60% to 85% by weight of linseed oil and about 15% to 40% by weight of a cyclic petroleum hydrocarbon fraction obtained as a by-product of the pyrolysis of petroleum, said fraction boiling between about 200° C. to 500° C., containing about 10% aromatics and having an iodine number of about 190 to 250.

13. A linoleum type composition comprising a pigment, a filler, and a cement containing the product obtained by oxidizing and polymerizing a mixture containing about 60% to 85% by weight of soya bean oil and about 15% to 40% by weight of a cyclic petroleum hydrocarbon fraction obtained as a by-product of the pyrolysis of petroleum, said fraction boiling between about 200° C. to 500° C., containing about 10% aromatics and having an iodine number of about 190 to 250.

14. A linoleum type composition comprising a pigment, a filler, and a cement containing the product obtained by oxidizing and polymerizing a mixture containing about 60% to 85% by weight of dehydrated castor oil and about 15% to 40% by weight of a cyclic petroleum hydrocarbon fraction obtained as a by-product of the pyrolysis of petroleum, said fraction boiling between about 200° C. to 500° C. containing about 10% aromatics and having an iodine number of about 190 to 250.

15. A linoleum type cement comprising the product obtained by oxidizing and polymerizing a mixture containing at least 50% by weight of a drying oil, and a cyclic petroleum hydrocarbon fraction obtained as a by-product of the pyrolysis of petroleum, said fraction boiling between about 200° C. and 500° C., containing about 10% aromatics and having an iodine number of about 190 to 250.

16. A linoleum type cement comprising the product obtained by oxidizing and polymerizing a mixture containing about 60% to 85% by weight of a siccative oil, and about 15% to 40% by weight of a cyclic petroleum hydrocarbon fraction obtained as a by-product of the pyrolysis of petroleum, said fraction boiling between about 200° C. and 500° C., containing about 10% aromatics and having an iodine number of about 190 to 250.

CHARLES G. ELLIOTT.

REFERENCES CITED

The following references are of record in the file of this patent:

UNITED STATES PATENTS

| Number | Name | Date |
|---|---|---|
| 1,201,625 | Rebs | Oct. 17, 1916 |
| 1,413,964 | Cabot | Apr. 25, 1922 |
| 2,047,149 | Koenig et al. | July 7, 1936 |
| 2,371,652 | Rostler et al. | Mar. 20, 1945 |